US012435658B2

(12) United States Patent
Kurashita

(10) Patent No.: US 12,435,658 B2
(45) Date of Patent: Oct. 7, 2025

(54) CATALYTIC CONVERTER

(71) Applicant: TOYOTA JIDOSHA KABUSHIKI KAISHA, Toyota (JP)

(72) Inventor: Fumiya Kurashita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 18/366,959

(22) Filed: Aug. 8, 2023

(65) Prior Publication Data
US 2024/0133334 A1 Apr. 25, 2024
US 2024/0229701 A9 Jul. 11, 2024

(30) Foreign Application Priority Data

Oct. 24, 2022 (JP) ................................ 2022-170018

(51) Int. Cl.
*F01N 13/18* (2010.01)
*B01D 53/94* (2006.01)
*F01N 13/00* (2010.01)

(52) U.S. Cl.
CPC ..... *F01N 13/1805* (2013.01); *B01D 53/9477* (2013.01); *B01D 53/9495* (2013.01); *F01N 13/008* (2013.01); *F01N 13/0093* (2014.06)

(58) Field of Classification Search
CPC ............... F01N 13/008; F01N 13/0093; F01N 13/1805; F01N 2470/30; B01D 53/9477; B01D 53/9495
See application file for complete search history.

(56) References Cited

U.S. PATENT DOCUMENTS

| 2008/0072580 A1 | 3/2008 | Nagaoka et al. |
| 2010/0158758 A1* | 6/2010 | Gustin ................. F01N 13/008 29/890 |
| 2010/0326059 A1 | 12/2010 | Mital et al. |
| 2015/0322838 A1* | 11/2015 | Qi ............................ F01N 9/00 60/287 |
| 2016/0123211 A1* | 5/2016 | Takano ................... F01N 13/10 60/323 |
| 2018/0252143 A1* | 9/2018 | Schliesche .......... F01N 13/1872 |

FOREIGN PATENT DOCUMENTS

| JP | 2004-092461 A | 3/2004 |
| JP | 2006-077675 A | 3/2006 |
| JP | 2007-146681 A | 6/2007 |
| JP | 2021-080914 A | 5/2021 |

OTHER PUBLICATIONS

English Translation of TWM604827U (Year: 2020).*

* cited by examiner

*Primary Examiner* — Anthony Ayala Delgado
(74) *Attorney, Agent, or Firm* — SoraIP, Inc.

(57) ABSTRACT

The catalytic converter has a first catalyst case containing a catalyst for cleaning a fluid, a second catalyst case containing a catalyst for cleaning the fluid downstream of the first catalyst case, a sensor for detecting the fluid is attached, and a connecting portion connected between the first catalyst case and the second catalyst case, the cross-sectional area of the first flow path of the fluid in the connecting portion is smaller than the cross-sectional area of the second flow path of the fluid in the first catalyst case, the first flow path, the mounting position side of the sensor with respect to the second flow path, the displacement width of the opposite side facing the mounting position is provided so as to be larger than the displacement width.

4 Claims, 6 Drawing Sheets

CATALYTIC CONVERTER

CROSS-REFERENCE TO RELATED APPLICATION

This application claims priority to Japanese Patent Application No. 2022-170018 filed on Oct. 24, 2022, incorporated herein by reference in its entirety.

BACKGROUND

1. Technical Field

The present disclosure relates to a catalytic converter.

2. Description of Related Art

For example, in Japanese Unexamined Patent Application Publication No. 2004-92461 (JP 2004-92461 A), a catalytic converter is described that includes two housing portions for housing a catalyst carrier on which a catalyst for cleaning exhaust gas is supported, and a diameter decreasing portion that connects the housing portions and has a mounting seat of an oxygen concentration sensor.

SUMMARY

The sensitivity of the oxygen concentration sensor varies with the flow rate of the exhaust gas that hits the detecting portion at the tip thereof. Depending on the shape of the diameter decreasing portion, since the exhaust gas hits the detecting portion at the tip of the oxygen concentration sensor at a low flow rate, there is a possibility that the sensitivity of the oxygen concentration sensor becomes insufficient. In contrast, when the detecting portion is extended toward an area where the flow rate is high in the diameter decreasing portion, the gas flow rate hitting the detecting portion can be increased to improve the sensitivity. However, since the detecting portion interrupts the flow of the exhaust gas, the efficiency of cleaning the exhaust gas may be lowered on the downstream side.

The present disclosure has been made in view of the above issue, and an object of the present disclosure is to provide a catalytic converter capable of improving a sensitivity of a sensor that detects a fluid while suppressing a decrease in efficiency of cleaning the fluid.

A catalytic converter according to the present disclosure includes: a first catalyst case that houses a catalyst that cleans a fluid; a second catalyst case that houses a catalyst that cleans the fluid on a downstream side of the first catalyst case; and a connecting portion on which a sensor that detects the fluid is mounted, the connecting portion being connected between the first catalyst case and the second catalyst case. A sectional area of a first flow path of the fluid in the connecting portion is smaller than a sectional area of a second flow path of the fluid in the first catalyst case. The first flow path is provided such that a displacement width with respect to the second flow path on a mounting position side of the sensor is larger than a displacement width on an opposite side of the first flow path from the mounting position.

In the catalytic converter described above, regarding a section of the first flow path, a dimension in a first direction in which the sensor protrudes into the first flow path may be larger than a dimension in a second direction substantially perpendicular to the first direction.

In the catalytic converter described above, a dimension of the first flow path may be smaller than a dimension of the second flow path in the second direction.

In the catalytic converter described above, the second flow path may be inclined with respect to a third flow path of the fluid in the second catalyst case.

In the catalytic converter described above, the connecting portion may include a first pressed component having a cone shape, the first pressed component being provided with a first open end defining the first flow path at an apex of the cone shape, and a second pressed component and a third pressed component each having a cone shape that is divided into two along a direction of flow of the fluid, the second pressed component and the third pressed component being provided with a second open end defining the first flow path at an apex of the cone shape. The first pressed component, the second pressed component, and the third pressed component may be assembled such that the first open end and the second open end are connected to each other, and one of the first pressed component and the second pressed component may be provided with a mounting portion for mounting the sensor.

According to the present disclosure, it is possible to improve the sensitivity of the sensor that detects the fluid while suppressing a decrease in efficiency of cleaning the fluid in the catalytic converter.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
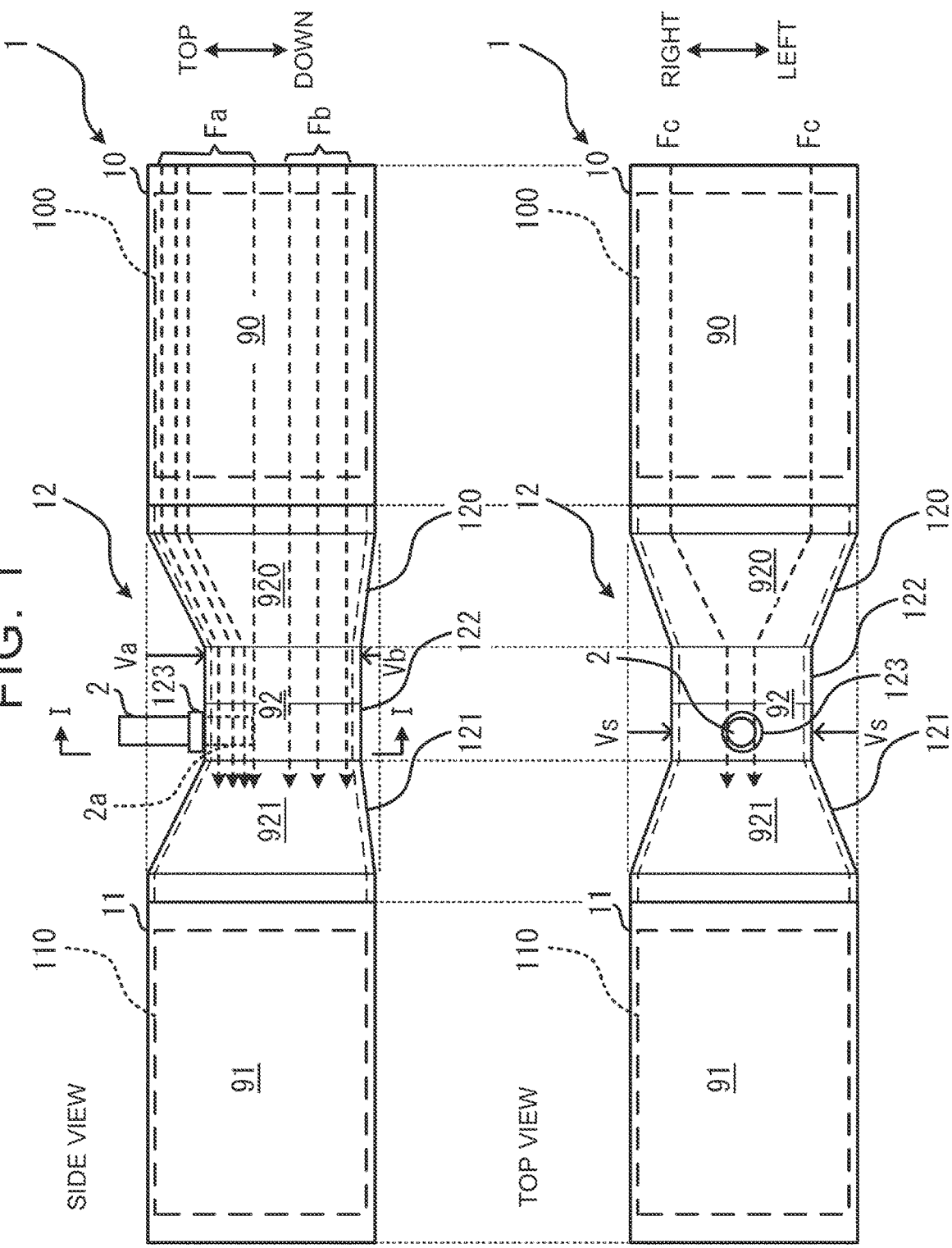
FIG. 1 is a plan view illustrating an example of a catalytic converter in a side view and a top view.

FIG. 1 is a plan view illustrating an example of a catalytic converter 1 in a side view and a top view. The catalytic converter 1 is provided in an exhaust system of an internal combustion engine such as a gasoline engine. The catalytic converter 1 includes an upstream-side catalyst case 10, a downstream-side catalyst case 11, and a connecting portion 12.

The upstream-side catalyst case 10 and the downstream-side catalyst case 11 are, for example, cylindrical metal members, and are connected in series via a connecting portion 12. The upstream-side catalyst case 10 and the downstream-side catalyst case 11 each have flow paths 90 and 91 of exhaust gas discharged from the exhaust manifold of the internal combustion engine. The flow paths 90 and 91 extend along the cylindrical central axis of the upstream-side catalyst case 10 and the downstream-side catalyst case 11, respectively. In the flow of the exhaust gas in the catalytic converter 1, the upstream-side catalyst case 10 is provided on the upstream side of the downstream-side catalyst case 11. The exhaust gas is an example of a fluid. The flow path 90 is an example of a second flow path, and the flow path 91 is an example of a third flow path.

The upstream-side catalyst case 10 houses a catalyst carrier 100, and the downstream-side catalyst case 11 houses a catalyst carrier 110. The catalyst support 100, 110 is disposed in the flow paths 90 and 91, respectively, and carries a catalyst (palladium or the like) for cleaning the exhaust gas. The upstream-side catalyst case 10 is an example of the first catalyst case, and the downstream-side catalyst case 11 is an example of the second catalyst case.

An air-fuel ratio sensor 2 is attached to the connecting portion 12, and is connected between the upstream-side catalyst case 10 and the downstream-side catalyst case 11. The connecting portion 12 includes a reduced diameter portion 120, a flow path portion 122, and an enlarged diameter portion 121. The reduced-diameter portion 120 is provided on the upstream side of the flow path portion 122, and the enlarged-diameter portion 121 is provided on the downstream side of the flow path portion 122. The reduced diameter portion 120 and the enlarged diameter portion 121 have a cone shape with an apex toward the flow path portion 122 side, and the flow path portion 122 has a substantially cylindrical shape. Note that an oxygen concentration sensor may be attached to the connecting portion 12 instead of the air-fuel ratio sensor 2.

The flow path 920 of the exhaust gas in the reduced-diameter portion 120 narrows from the flow path 90 of the exhaust gas in the upstream-side catalyst case 10 toward the flow path 92 of the exhaust gas in the reduced-diameter portion 120. The flow path 921 of the exhaust gas in the enlarged diameter portion 121 is enlarged from the flow path 92 of the exhaust gas in the reduced diameter portion 120 toward the flow path 91 of the exhaust gas in the downstream-side catalyst case 11. The cross-sectional area of the flow path 92 in the flow path portion 122 is substantially constant along the flow of the exhaust gas. The flow path 92 is an example of a first flow path.

A mounting seat 123 to which the air-fuel ratio sensor 2 is mounted is provided on an upper surface of the reduced-diameter portion 120. The air-fuel ratio sensor 2 has a substantially cylindrical shape and is inserted into a central hole of the mounting seat 123. At the time of inserting, the detection portion 2a at the front end of the air-fuel ratio sensor 2 is exposed to the flow path 92 in the flow path portion 122. The mounting seat 123 is an example of a mounting portion to which the air-fuel ratio sensor 2 is mounted.

The air-fuel ratio sensor 2 is an example of a sensor that detects exhaust gas. Specifically, the air-fuel ratio sensor 2 detects the air-fuel ratio of the internal combustion engine from the exhaust gas corresponding to the detection portion 2a. The air-fuel ratio sensor 2 transmits a detection signal of the air-fuel ratio to a control device (not shown), and the control device performs feedback control of the internal combustion engine based on the detection signal. Therefore, if the sensitivity of the air-fuel ratio sensor 2 is low, the detection of the air-fuel ratio may be delayed and the accuracy of the control may be lowered so that the detection can follow the speed of the feedback control.

On the other hand, in order to increase the sensitivity of the air-fuel ratio sensor 2, the flow path 92 in the connecting portion 12 is provided so that the mounting seat 123 side is displaced more than the opposite side of the mounting seat 123 with respect to the flow path 90 in the upstream-side catalyst case 10. Therefore, in the side view of the catalytic converter 1, the difference Va between the upper surface of the flow path portion 122 in which the mounting seat 123 of the air-fuel ratio sensor 2 is provided and the position in the height direction of the upper surface of the upstream-side catalyst case 10 is larger than the difference Vb between the position in the height direction of the lower surface of the flow path portion 122 and the position in the height direction of the lower surface of the upstream-side catalyst case 10.

Figure 2:
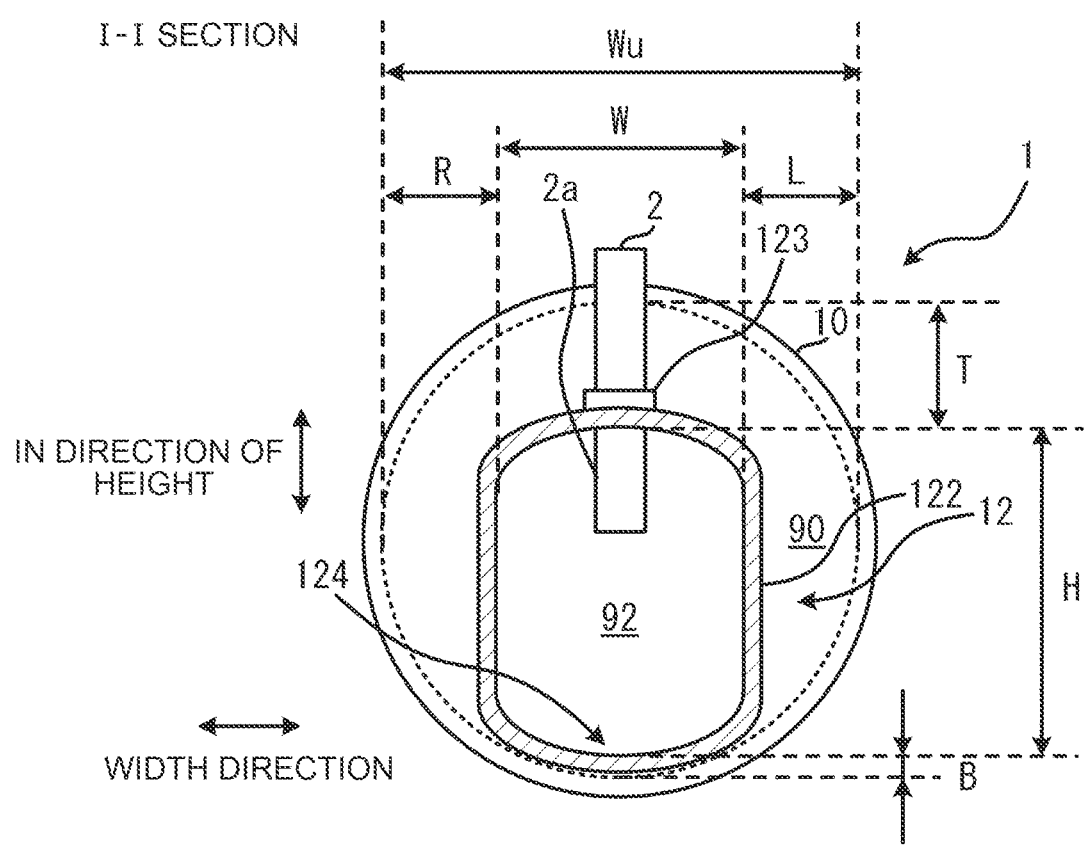
FIG. 2 is a cross-sectional view of the catalytic converter taken along I-I of FIG. 1.

FIG. 2 is a cross-sectional view of the catalytic converter 1 along I-I of FIG. 1. FIG. 2 shows a flow path 92 in the connecting portion 12 and a flow path 90 in the upstream-side catalyst case 10 in a front view facing the direction in which the exhaust gas flows. The air-fuel ratio sensor 2 protrudes into the flow path 92 in the connecting portion 12, and the detection portion 2a at the distal end thereof is exposed to the flow path 92. Here, a direction in which the air-fuel ratio sensor 2 protrudes is defined as a height direction of the flow path 92, and a direction orthogonal to the height direction is defined as a width direction of the flow path 92. The height direction is an example of the first direction, and the width direction is an example of the second direction.

The cross-sectional area of the flow path 92 in the connecting portion 12 is smaller than the flow path 90 in the upstream-side catalyst case 10. Further, the flow path 92 in the connecting portion 12 is provided such that the displacement width T on the mounting seat 123 side of the air-fuel ratio sensor 2 with respect to the flow path 90 in the upstream-side catalyst case 10 is larger than the displacement width B on the opposite position 124 side of the flow path 92 from the mounting seat 123.

Therefore, as shown in FIG. 1, in a side view of the catalytic converter 1, the flow Fa of the exhaust gases on the upper side in the flow path 90 of the upstream-side catalyst case 10 concentrates on the detection portion 2a of the air-fuel ratio sensor 2. Specifically, the exhaust gas on the upper side flows along the flow path 90 in the upstream-side catalyst case 10, changes its direction downward along the flow path 920 in the reduced-diameter portion 120, and flows into the flow path 92 in the flow path portion 122 to concentrate on the detection portion 2a. As a result, the flow rate of the exhaust gas in the detection portion 2a of the air-fuel ratio sensor 2 is increased as compared with the case where the displacement width T on the mounting seat 123 side is the same as the displacement width B on the opposite position 124 side.

On the other hand, in a side view of the catalytic converter 1, the flow Fb of the exhaust gas on the lower side in the flow path 90 of the upstream-side catalyst case 10 is smaller in the flow direction than the flow Fa of the exhaust gas on the upper side, flows substantially linearly into the flow path 92 in the flow path portion 122, and flows into the flow path 91 in the downstream-side catalyst case 11 without hitting the detection portion 2a. Therefore, the flow Fb of the exhaust gas on the lower side is less likely to be blocked by the detection portion 2a than the flow Fa of the exhaust gas on the upper side, and thus the pressure-loss can be suppressed.

Therefore, the catalytic converter 1 can improve the sensitivity of the air-fuel ratio sensor 2 while suppressing a decrease in the cleaning efficiency of the exhaust gas.

Further, as shown in FIG. 2, in the cross section of the flow path 92, the dimension H in the height direction is larger than the dimension W in the width direction. In the present embodiment, the dimension H in the height direction is the distance from the root of the exposed area of the detection portion 2a in the flow path 92 to the opposite position 124 facing the mounting seat 123. Therefore, as compared with the case where the dimension H in the height direction is equal to or smaller than the dimension W in the width direction, the exhaust gases hardly diffuse to the left and right in the width direction of the flow path 92, and are easily concentrated on the detection portion 2a of the air-fuel ratio sensor 2. Therefore, the flow rate of the exhaust gas in the detection portion 2a of the air-fuel ratio sensor 2 is increased, and the sensitivity of the air-fuel ratio sensor 2 is further improved. In the case of the flow path 92 having a cross-sectional shape in which the dimension W in the width direction is different depending on the position in the height direction, the above-described effect can be obtained by setting the dimension H in the height direction to be larger than the maximum value of the dimension W in the width direction, for example.

In addition, since the cross section of the flow path 92 has an oval shape, the resistance to stress is improved. For example, when the cross section of the flow path 92 has a shape in which the radius of curvature of the bent portion is small, such as a polygonal shape or a teardrop shape, when the connecting portion 12 expands due to the heat of the exhaust gas and stress is generated, or when stress is generated due to vibration, there is a possibility that the stress is concentrated and deformed in the bent portion. Therefore, by using a shape having a large radius of curvature of the bent portion like an oval shape, it is possible to suppress the concentration of stress and improve the strength.

Further, in a top view of the catalytic converter 1, the positions of the left and right side surfaces of the flow path portion 122 are shifted to the center side by the difference Vs from the positions of the left and right side surfaces of the upstream-side catalyst case 10. Specifically, as shown in FIG. 2, the dimension W of the flow path 92 is smaller than the dimension Wu of the flow path 90 in the upstream-side catalyst case 10. The deviation width L of the position of the left side surface of the flow path portion 122 with respect to the left side surface of the upstream-side catalyst case 10 and the deviation width R of the position of the right side surface of the flow path portion 122 with respect to the right side surface of the upstream-side catalyst case 10 may be the same or different.

Therefore, in a top view of the catalytic converter 1 shown in FIG. 1, the flow Fc of the left and right exhaust gases in the flow path 90 of the upstream-side catalyst case 10 concentrates on the detection portion 2a of the air-fuel ratio sensor 2. Specifically, the left and right exhaust gases flow along the flow path 90 in the upstream-side catalyst case 10, change the direction toward the center along the flow path 920 in the reduced-diameter portion 120, and flow into the flow path 92 in the flow path portion 122 so as to concentrate on the detection portion 2a. Therefore, the flow rate of the exhaust gas in the detection portion 2a of the air-fuel ratio sensor 2 is increased, and the sensitivity of the air-fuel ratio sensor 2 is further improved.

Figure 3:
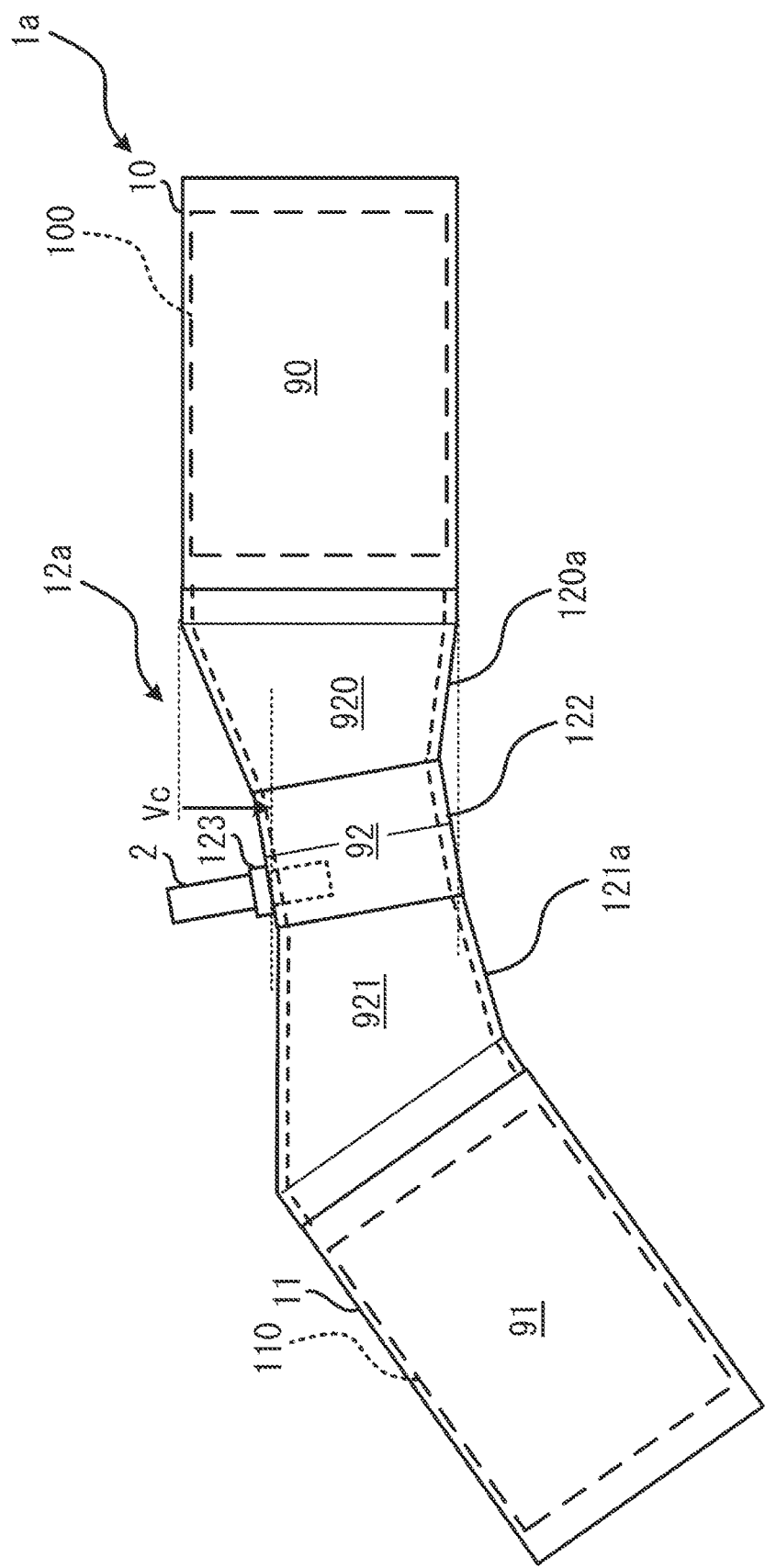
FIG. 3 is a side view illustrating another example of the catalytic converter.

FIG. 3 is a side view illustrating another exemplary catalytic converter 1a. In the catalytic converter 1a, unlike the catalytic converter 1 described above, the flow path 90 in the upstream-side catalyst case 10 and the flow path 91 in the downstream-side catalyst case 11 are different from each other.

The catalytic converter 1a has, instead of the connecting portion 12, a connecting portion 12a corresponding to the upstream-side catalyst case 10 and the downstream-side catalyst case 11 having different angles. The connecting portion 12a includes a reduced-diameter portion 120a, a flow path portion 122, and an enlarged-diameter portion 121a. The reduced-diameter portion 120a is formed in a shape corresponding to the positional relationship between the flow path portion 122 and the upstream-side catalyst case 10, and the enlarged-diameter portion 121a is formed in a shape corresponding to the positional relationship between the flow path portion 122 and the downstream-side catalyst case 11. For example, since the inlet of the flow path 91 of the downstream-side catalyst case 11 is located above the outlet, the region on the upper surface side of the enlarged diameter portion 121a is formed to be wider than the region on the lower surface side.

Also in this example, the flow path 92 in the flow path portion 122 is provided so that the mounting seat 123 side is displaced more than the opposite side of the mounting seat 123 with respect to the flow path 90 in the upstream-side catalyst case 10. The upper surface of the flow path portion 122 near the mounting seat 123 is shifted by a difference Vc (>0) with respect to the upper surface of the upstream-side catalyst case 10. On the other hand, the lower surface of the flow path portion 122 in the vicinity of the position facing the mounting seat 123 is substantially the same position as the lower surface of the upstream-side catalyst case 10. Therefore, the catalytic converter 1a of the present embodiment can achieve the same advantages as those of the catalytic converter 1 described above.

When the flow path 90 in the upstream-side catalyst case 10 and the flow path 91 in the downstream-side catalyst case 11 are arranged substantially in parallel as in the above-described catalytic converter 1, it is considered that it is difficult to mount the catalytic converter 1 depending on the shape of the internal combustion engine. On the other hand, in the catalytic converter 1a, since the flow path 90 in the upstream-side catalyst case is inclined with respect to the flow path 91 in the downstream-side catalyst case 11, the catalytic converter 1a can be easily attached in the above-described cases.

Further, as described below, when the connecting portion 12, 12a is formed by a pressed component, it is easy to form the reduced-diameter portion 120, 120a and the enlarged-diameter portion 121, 121a corresponding to the positional relation between the upstream-side catalyst case 10 and the downstream-side catalyst case 11.

Figure 4:
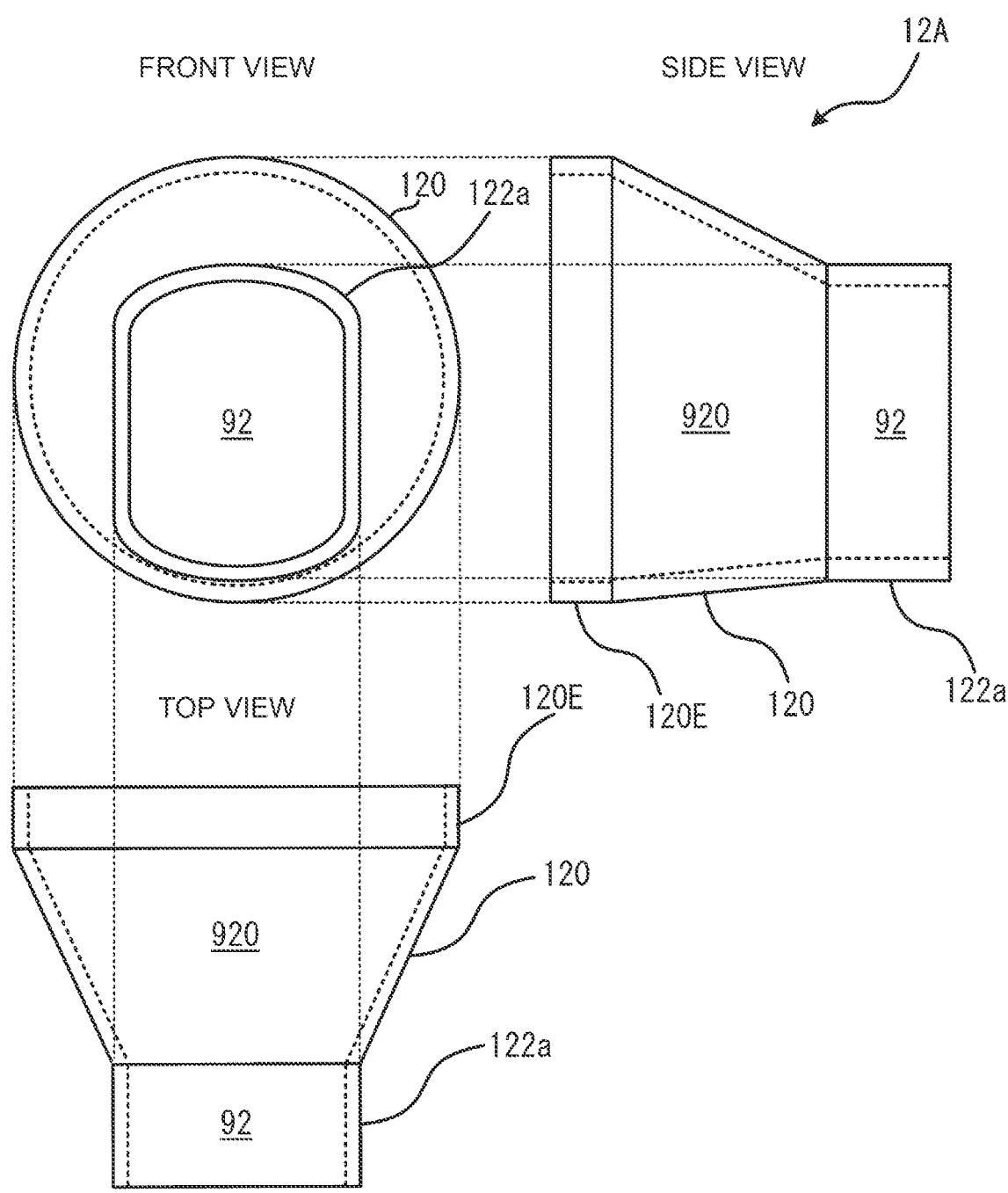
FIG. 4 is a plan view illustrating an exemplary pressed component 12A of the connecting portion.
Figure 5:
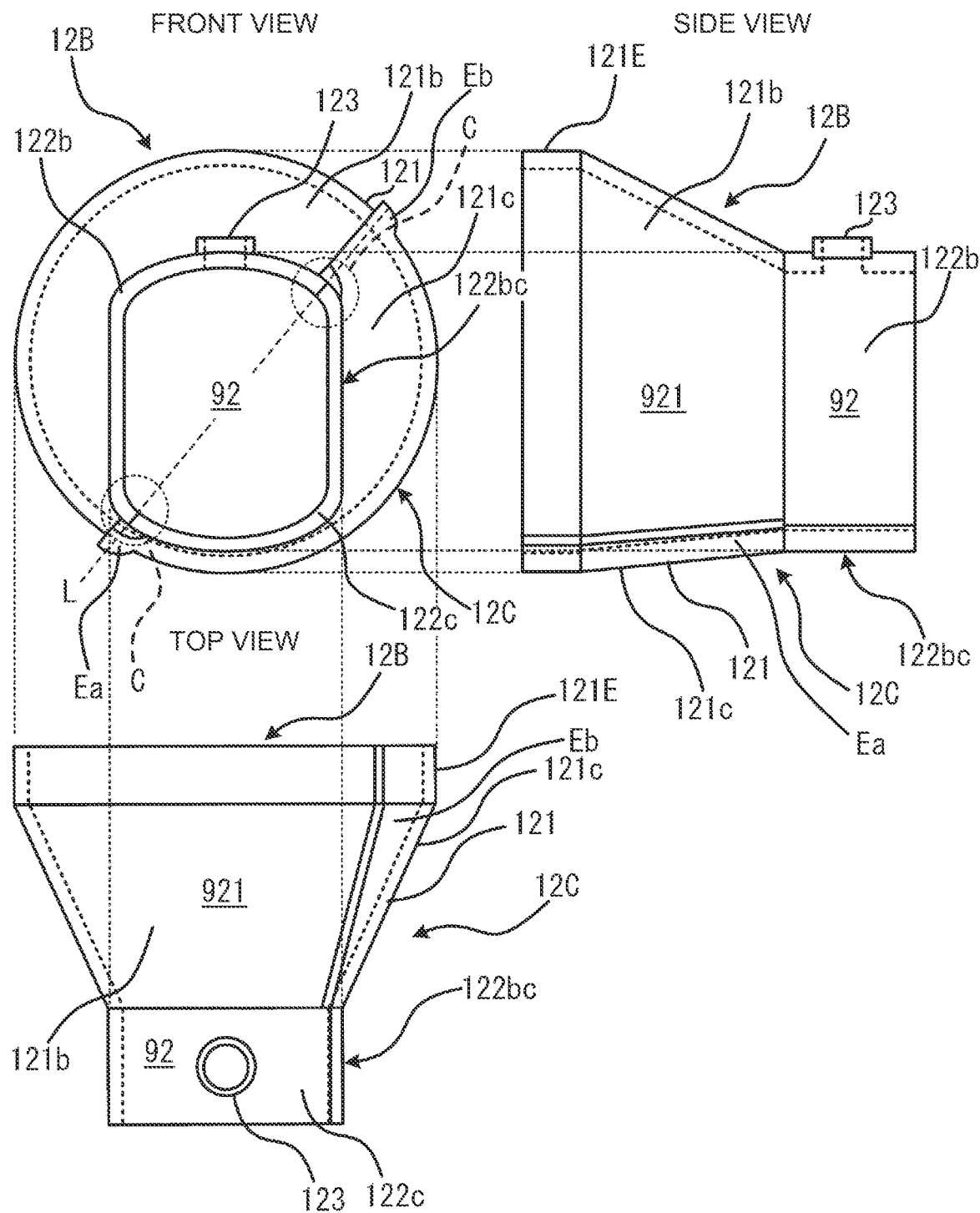
FIG. 5 is a plan view of an exemplary two other pressed components of the connecting portion.

FIG. 4 is a plan view showing an example of the pressed component 12A of the connecting portion 12, and FIG. 5 is a plan view showing an example of the other two pressed components 12B, 12C of the connecting portion 12. The connecting portion 12 includes, for instance, three pressed components 12A to 12C. In this embodiment, pressed components 12A to 12C of the connecting portion 12 shown in FIG. 1 will be given, but the connecting portion 12a shown in FIG. 3 is also formed from the pressed component of the connecting portion 12.

FIG. 4 shows a pressed component 12A including a reduced-diameter portion 120 and a portion of the flow path portion 122 in a front view, a top view, and a side view, respectively. The pressed component 12A is an example of a first pressed component. The pressed component 12A has a cone-shaped apex and bottom opening. The pressed component 12A has an open end 122a at the apex that defines a flow path 92 in the flow path portion 122. Further, an end portion 120E opposite to the open end 122a is joined to the upstream-side catalyst case 10. Thus, the end 120E is formed with an opening having a substantially constant diameter. The open end 122a is an exemplary first opening end.

The pressed component 12A is formed by pressing a metallic plate into a cone shape. Here, the open end 122a is formed, for example, by burring. The open end 122a is fitted to an open end of another pressed component 12B, 12C to be described later.

FIG. 5 shows a pressed component 12B, 12C including the enlarged diameter portion 121 and a part of the flow path portion 122 in a front view, a top view, and a side view, respectively. The pressed component 12B, 12C are shown mated with one another.

The pressed component 12B, 12C has a cone shape similar to the pressed component 12A and a shape divided into two along the flow direction of the exhaust gas. A cone-shaped apex is provided with an open end 122bc that defines a flow path 92 in the flow path portion 122. The end 121E opposite to the open end 122bc is joined to the downstream-side catalyst case 11. Thus, the end 121E is formed with an opening having a substantially constant diameter. The open end 122bc is fitted to the open end 122a of the pressed component 12B, 12C.

The pressed component 12B, 12C divides the cross section of the flow path 92 into two with the diagonal line L interposed therebetween. The diagonal line L extends obliquely with respect to the height direction and the width direction so as not to cross the mounting seat 123. Specifically, the diagonal line L divides the oval-shaped cross section of the flow path 92 into two substantially symmetrical regions.

The pressed component 12B, 12C has a portion 121b, 121c obtained by dividing the enlarged diameter portion 121 into two portions, and a portion 122b, 122c obtained by dividing the open end 122bc into two portions. The open end 122bc is formed by welding the end faces of the portion 122b, 122c of the respective pressed component 12B, 12C in abutting relation to each other, as indicated by reference numeral C. The area of the open portion of the open end 122bc is larger than the open end 122a so as to partially overlap and mate with the open end 122a. The enlarged diameter portion 121 is formed by welding a bent portion Ea, Eb obtained by bending both end edges of a portion 121c of the pressed component 12C in a stepped shape, and overlapping and welding the bent portion Ea, Eb on both end edges of the portion 121b of the other pressed component 12B. Further, the pressed component 12B has a mounting seat 123. The open end 122bc is an exemplary second open end.

The pressed component 12B, 12C is formed by pressing a metallic plate. For example, the pressed component 12B, 12C is processed from a common-metal plate with the portion 121b, 121c obtained by dividing the enlarged diameter portion 121 into two portions facing each other. This improves the productivity of the pressed component 12B, 12C as compared to a separate sheet metal.

Further, the pressed component 12B, 12C has a shape obtained by dividing the cone shape into two, and the mounting seat 123 is formed on one of the pressed component 12B by the drilling process. Therefore, as compared with the case where the enlarged diameter portion 121 and the flow path portion 122 is formed as one piece as in the other pressed component 12A, it is easy to arbitrarily process the length and the shape of the open end 122bc, it is also easy to form the mounting seat 123 on the open end 122bc.

Figure 6:
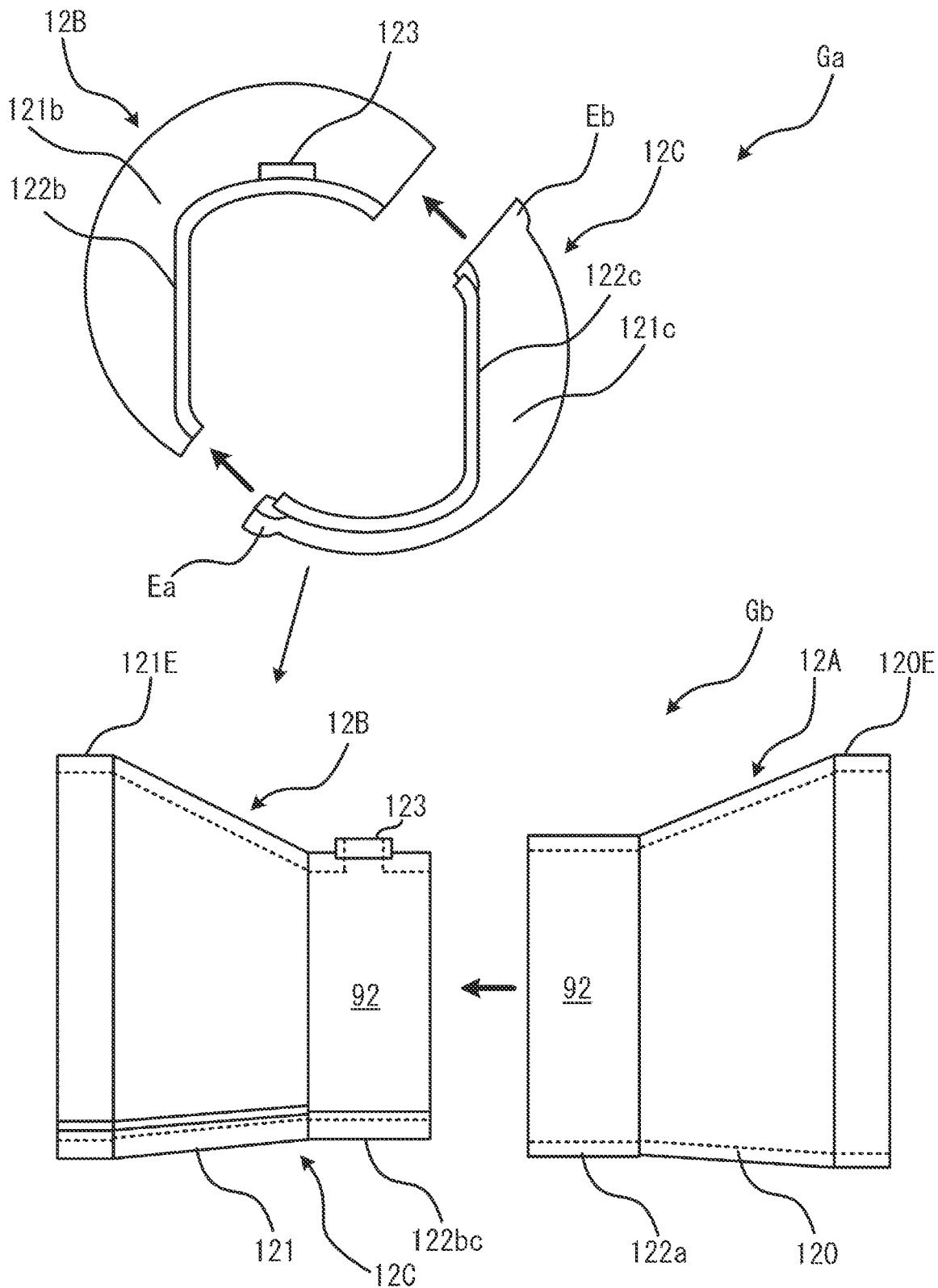
FIG. 6 is a diagram illustrating an example of a method of assembling a pressed component.

FIG. 6 is a diagram illustrating an exemplary assembly process of the pressed components 12A to 12C. In FIG. 6, the same components as those in FIG. 4 and FIG. are denoted by the same reference numerals, and the description thereof will be omitted.

Reference numeral Ga denotes a front view showing the assembly of the pressed component 12B, 12C to each other. By superimposing the bent portion Ea, Eb of the portion 121c of the pressed component 12C on the respective end edges of the portion 121b of the pressed component 12B, the pressed component 12B, 12C are fitted to each other (see an arrow). At this time, the end faces on the portion 122b, 122c of the respective pressed component 12B, 12C are in contact with each other so that the open end 122bc is formed. As a result, a cone-shaped member including a part of the enlarged diameter portion 121 and the flow path portion 122 is completed.

The reference numeral Gb indicates, in a side view, the assembly of the combined pressed component 12B, 12C and the pressed component 12A. The open end 122a, 122bc are fitted to each other by overlapping the leading end of the open end 122a of the pressed component 12A with the leading end of the open end 122bc of the pressed component 12B, 12C (see arrows). As a result, the connecting portion 12 is completed. Incidentally, in this embodiment, of the connecting portion 12, the member on the enlarged diameter portion 121 side is constituted by two pressed components 12B, 12C, the member on the reduced diameter portion 120 side is constituted by one pressed component 12A, but conversely, the member on the enlarged diameter portion 121 side may be constituted by one pressed component A, and the member on the reduced diameter portion 120 side may be constituted by two pressed components 12B, 12C.

What is claimed is:

1. A catalytic converter comprising:
   a first catalyst case that houses a catalyst that cleans a fluid;
   a second catalyst case that houses a catalyst that cleans the fluid on a downstream side of the first catalyst case; and
   a connecting portion on which a sensor that detects the fluid is mounted, the connecting portion being connected between the first catalyst case and the second catalyst case, wherein:
   the connecting portion includes a first flow path of the fluid,
   the first catalyst case includes a second flow path of the fluid,
   the second catalyst case includes a third flow path of the fluid,
   a sectional area of the first flow path is smaller than a sectional area of the second flow path,
   the first flow path is provided such that a displacement width with respect to the second flow path on a mounting position side of the sensor is larger than a displacement width on an opposite side of the first flow path from the mounting position, and
   the second flow path is inclined with respect to the third flow path.

2. The catalytic converter according to claim 1, wherein regarding a section of the first flow path, a dimension in a first direction in which the sensor protrudes into the first flow path is larger than a dimension in a second direction perpendicular to the first direction.

3. The catalytic converter according to claim 2, wherein a dimension of the first flow path is smaller than a dimension of the second flow path in the second direction.

4. The catalytic converter according to claim 1, wherein:
   the connecting portion includes
   a first pressed component having a cone shape, the first pressed component being provided with a first open end defining the first flow path at an apex of the cone shape, and a second pressed component and a third pressed component each having a cone shape that is divided into two along a direction of flow of the fluid, the second pressed component and the third pressed component being provided with a second open end defining the first flow path at an apex of the cone shape, the first pressed component, the second pressed component, and the third pressed component are assembled such that the first open end and the second open end are connected to each other, and one of the first pressed component and the second pressed component is provided with a mounting portion to mount the sensor on the connecting portion.

* * * * *